United States Patent [19]

Nishimura et al.

[11] 4,141,037

[45] Feb. 20, 1979

[54] SIGNAL GATING SYSTEM

[75] Inventors: Toshimichi Nishimura, Tama; Fumio Nagumo, Yokohama; Seisuke Yamanaka, Mitaka, all of Japan

[73] Assignee: Sony Corporation, Tokyo, Japan

[21] Appl. No.: 783,062

[22] Filed: Mar. 30, 1977

[30] Foreign Application Priority Data

Mar. 30, 1976 [JP] Japan .................................. 51-34920

[51] Int. Cl.² .......................... H04N 9/535; H04N 9/04
[52] U.S. Cl. ......................................... 358/44; 358/21; 358/37
[58] Field of Search ...................... 358/21, 31, 41, 43, 358/44, 160, 36, 37

[56] References Cited

U.S. PATENT DOCUMENTS 3,798,353   3/1974   Illetschko ............................... 358/37

*Primary Examiner*—Robert L. Richardson
*Attorney, Agent, or Firm*—Hill, Gross, Simpson, Van Santen, Steadman, Chiara & Simpson

[57] ABSTRACT

In processing a video signal, vertical correlation is utilized between video signals of successive line intervals. Video signals from the two line intervals are examined, their existences, polarities and magnitudes between them. If both signals exist with the same polarity, a smaller signal in magnitude is derived at a system output and otherwise no signal appears at the output. This system can be applied to a color television camera circuit.

6 Claims, 22 Drawing Figures

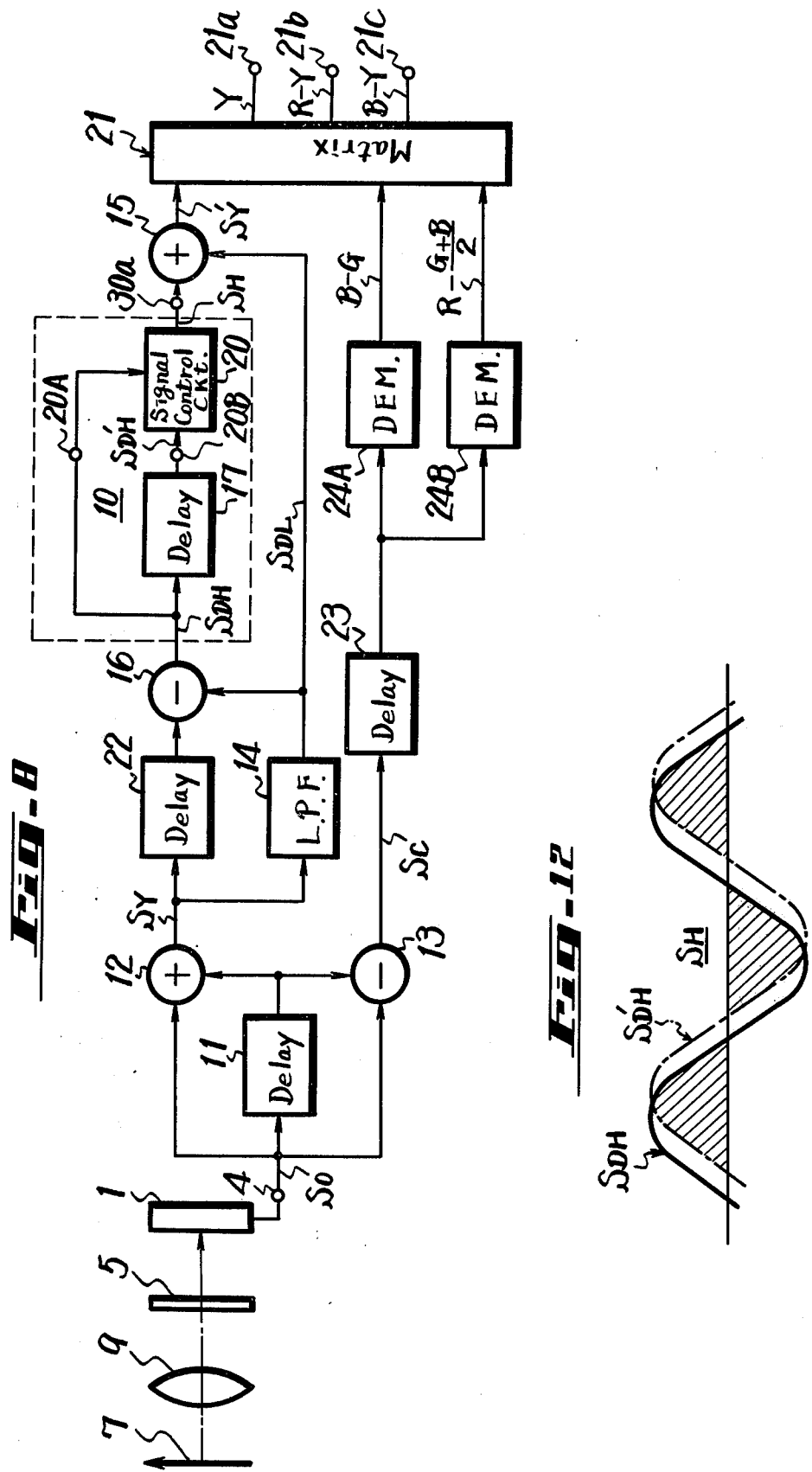

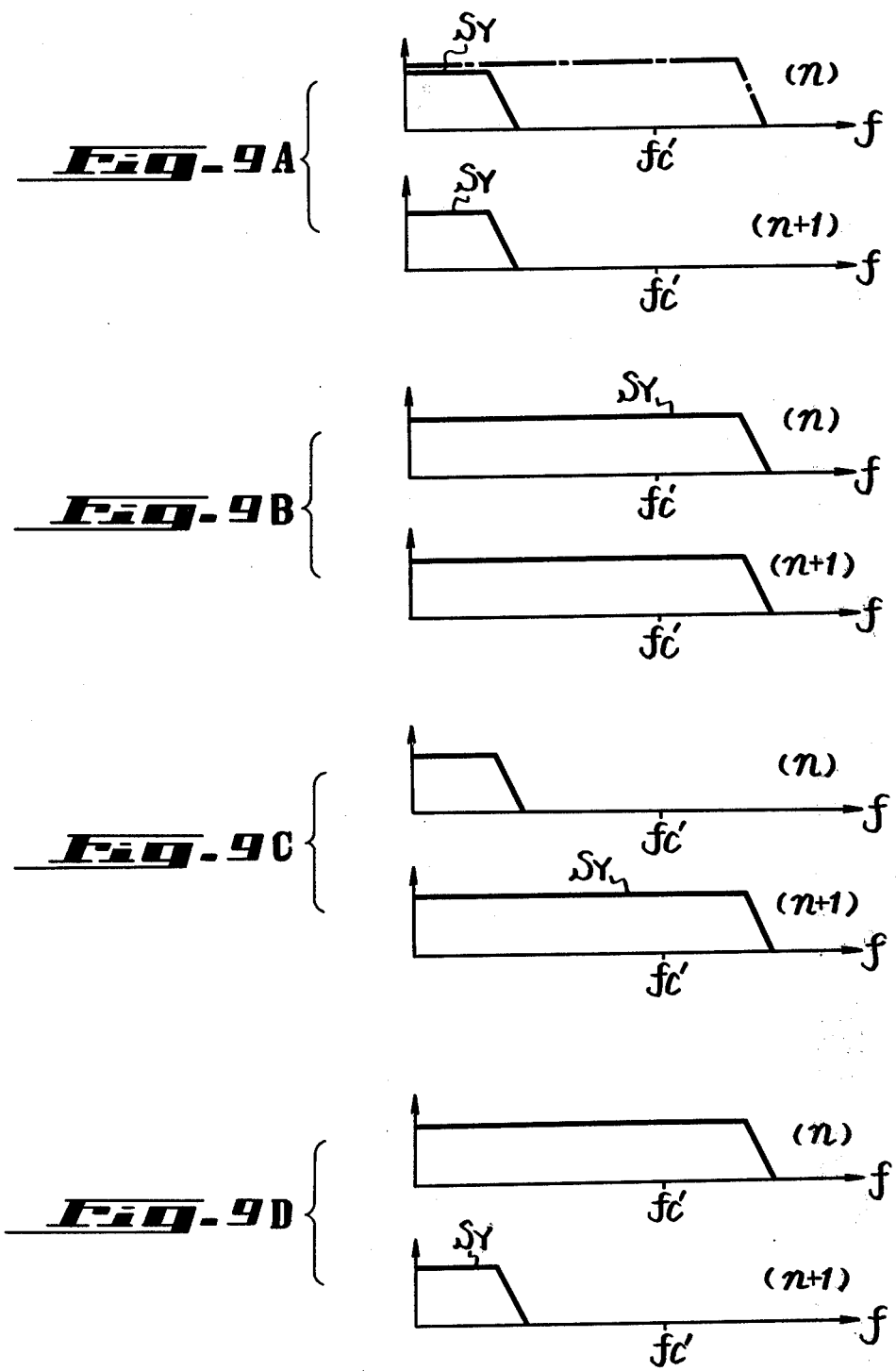

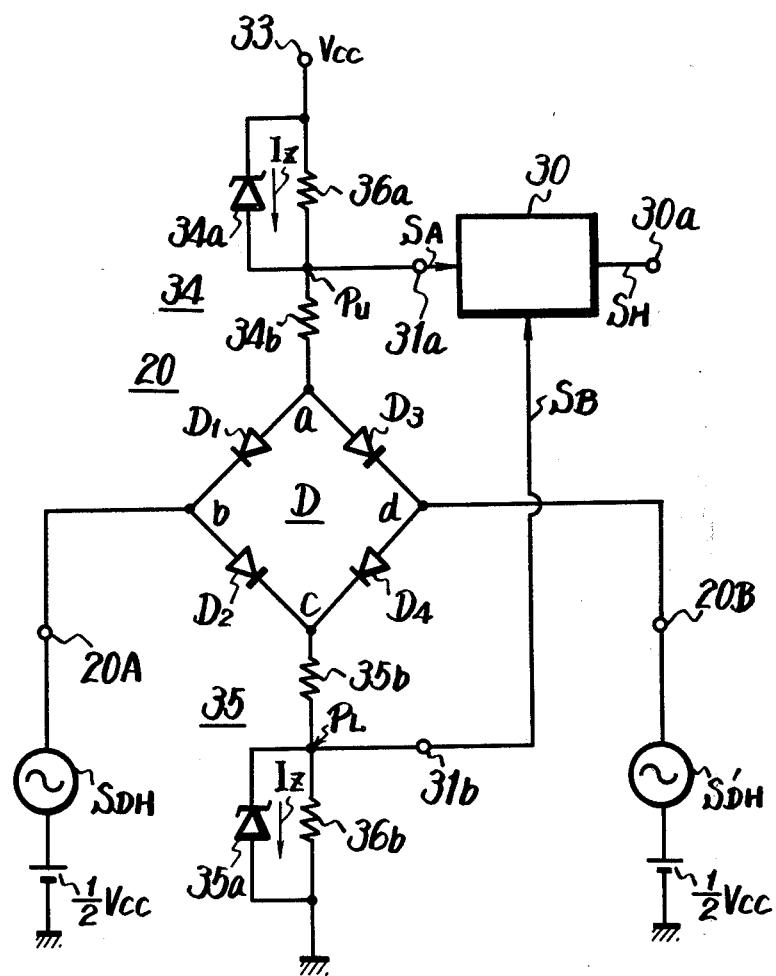

SIGNAL GATING SYSTEM

BACKGROUND OF THE INVENTION

1. Field of the Invention

This invention relates generally to a signal gating system, and more particularly to a signal control system to be applied to a cyclic signal such as a video signal. A dot-like noise cancelling circuit installed in a television color camera system is one of applications of this invention as described herein.

2. Description of the Prior Art

There has been known a color camera system wherein a vertical correlation between two successive line video signals is introduced upon separating a modulated color signal and a luminance signal from output signals derived from an imaging device having a color coding filter. In this separation system, the video signals have to have the vertical correlation. However, there is such a case that the vertical correlation is feeble or no vertical correlation exists. In case of feeble vertical correlation, two information signals cannot be separated completely. That is, in one signal component there remains the other signal component in multi-imposed state, and this residual signal component affects and on a reproduce picture badly. In other words, a dot-like undesirable pattern appears on the reproduced picture screen.

OBJECTS AND SUMMARY OF THE INVENTION

It is an object of the present invention to provide a novel signal gating system.

It is another object of the invention to provide a signal gating system suitable for signal processing in which a correlation exists between signals in successive two periods, which corresponds to a signal processing of signals in successive two horizontal scanning periods when a video signal is treated.

It is a further object of the invention to provide a signal gating system in which the correlativity between successive two horizontal scanning periods exerts on the gating operation.

It is a further object of the invention to provide a signal gating system which includes one horizontal interval delay device and in which two input signals serve as gating signals with each other to carry out such a control that either one of the input signals or none of them is delivered as an output signal in response to the polarity and magnitude of the input signals.

It is a yet further object of the invention to provide a signal gating system suitable as a signal processing circuit for a color television camera.

According to an aspect of the invention, there is provided a signal gating system to be adapted to a periodic signal processing circuit which comprises a system input terminal to be supplied with an incoming periodic signal, a delay device for delaying said periodic signal by one period of said periodic signal, a gate circuit having a pair of input terminals to which said incoming periodic signal and delayed periodic signal through said delay device are applied respectively, said gate circuit being operated in response to a correlativity between signals supplied to said pair of input terminals, and a system output terminal for deriving one of said signals supplied to said pair of input terminals of said gate device selectively in response to the operation of said gate circuit.

The other objects, features and advantages of the present invention will be apparent from the following description taken in conjunction with the accompanying drawings.

BRIEF DESCRIPTION OF THE DRAWINGS

FIG. 8 is a systematic diagram showing the main part of a color camera apparatus in which the signal processing system of the present invention is employed;

FIGS. 9A to 9D are frequency spectrum diagrams of a color picked-up signal which was already subjected to the vertical correlation processing, respectively;

FIGS. 10 and 11 are connection diagrams showing examples of the signal processing circuit of the invention;

FIG. 12 is a waveform diagram used for the explanation of the signal processing circuit.

DESCRIPTION OF THE PREFERRED EMBODIMENT

In order to better understand the present invention, the case where the invention is applied to a color video camera will be described.

For example, in the case that a solid state image sensor such as a CCD (Charge-Coupled Device) or the like is used as an image sensing device, usually a color picked-up signal is obtained such that color components are in a multi-imposed state in a luminance component, as described later. Therefore, upon separating the luminance signal and chrominance signal components, there may occur such a phenomenon that the multi-imposed signal remains in the other signal and affects the reproduced picture badly.

The above phenomenon will be described with reference to the drawings, and such a case that the CCD, especially a CCD of a frame transfer system is used as the solid state image sensor will be described by way of example.

Figure 1:
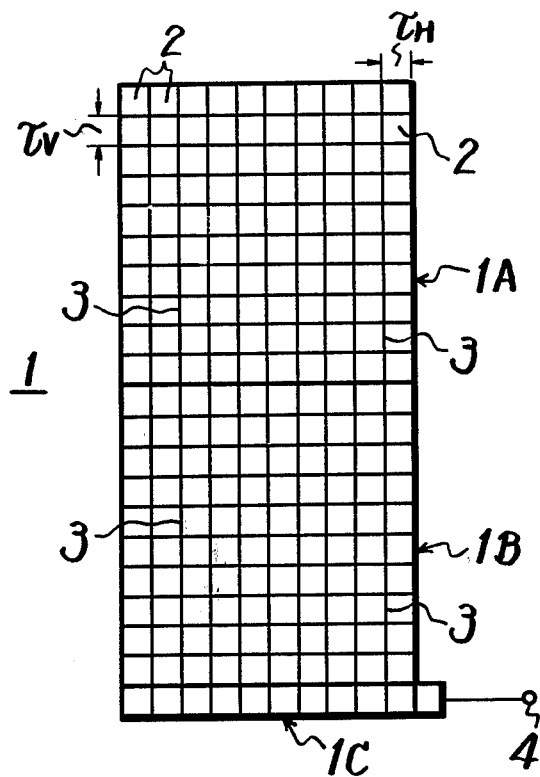
FIG. 1 is a plan view showing an example of a solid state image sensor which is used as an image sensing device in a television color camera.

FIG. 1 is a schematic diagram showing a CCD 1 in the form of a frame transfer system. In FIG. 1, 1A designates an image sensing member or array on which an object to be picked up is projected and which is formed of picture cells or elements 2 of a desired number aligned in both the horizontal and vertical directions, 1B a storage array or member which stores a carrier corresponding to the input light informations of the object at every frame or field and which is formed substantially the same as the image sensing member 1A except that the storage member 1B is shielded from light, and 1C a read-out register or array by which the carrier stored in the storage member 1B and corresponding to 1H (H represents one horizontal scanning period) is read out in series or successively. Further, in FIG. 1, 3 indicate channel stoppers and 4 an output terminal led out from the read-out register 1C.

Figure 2:
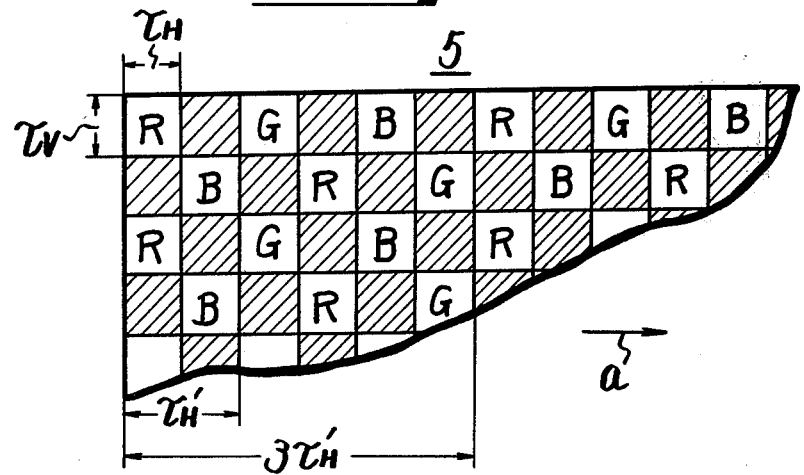
FIG. 2 is a plan view showing a part of a color filter in enlarged scale which is used in the television color camera.

FIG. 2 shows an example of a color filter 5 which will be located in front of the CCD 1. This color filter 5 consists of a transparent area which is divided into a plurality of areas corresponding to the areas of the respective picture elements 2 and an opaque area which is also divided into a plurality of areas corresponding to the picture elements 2. In this case, the plurality of opaque areas and transparent areas are aligned alternately in the horizontal scanning direction a and the vertical direction, respectively, so that the transparent and opaque areas form a checked pattern, and the opaque area is shifted by an alignment pitch $\tau_H$ of the transparent and opaque areas from the transparent area between the adjacent horizontal scanning lines as shown in FIG. 2.

The color filter 5 is so selected that the lights which pass through the transparent areas of the color filter 5 are primary colors, for example, R(red), G(green) and B(blue) color lights as shown in FIG. 2 and the primary color lights from the adjacent horizontal scanning lines are reversed in phase.

Figure 3A:
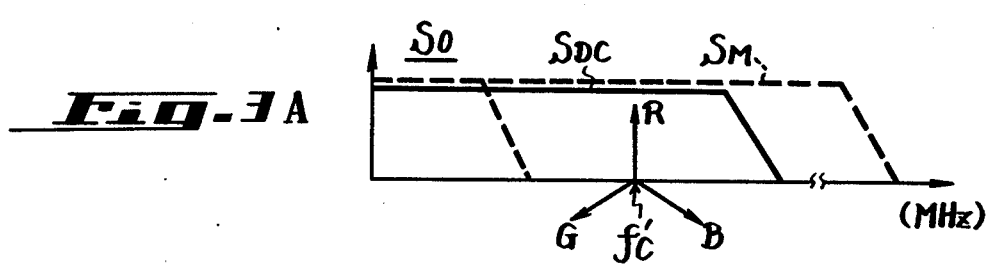
FIGS. 3A and 3B are frequency spectrum diagrams showing examples of color picked-up signals including the phase relation of the color components, respectively.

If an object is picked up by projecting it through the color filter 5 having the checked pattern on the CCD 1 of the color video camera, a color picked-up signal $S_o$ shown in FIG. 3A is obtained at the output terminal 4. In this case, since the input light information in accordance with the object to be picked up is sampled at every picture element and converted to an electrical signal, the color picked-up signal $S_o$ includes a baseband component $S_{DC}$, which will become the luminance signal and a side-band component (AC component) $S_M$ as shown in FIG. 3A.

In this case, if the base-band component $S_{DC}$ and the sampling frequency $f_c'$ ($=\frac{1}{2}\tau_H'$) are selected adequately, the side-band component $S_M$ does not exist in the baseband component $S_{DC}$ as shown in FIG. 3A. However, if the above state is obtained, it is necessary to make the bank width of the base-band component $S_{DC}$ narrow. On the contrary, if the band width of the base-band component $S_{DC}$ is selected, for example, about 3.5 MH$_z$ as in the ordinary case, the sampling frequency $f_c'$ is selected high correspondingly. As a result, it becomes necessary to increase a number N of the picture elements in the horizontal scanning direction which is not practical.

Figure 3B:
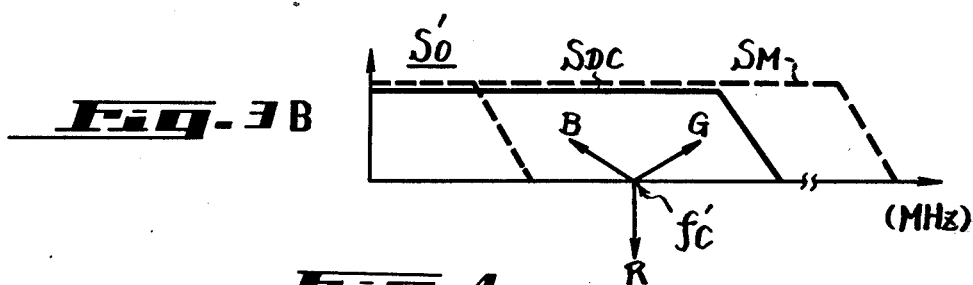

Accordingly, in general both the components $S_{DC}$ and $S_M$ are overlapped. Thus, if the number N of the picture elements is small, in the color picked-up signal $S_o$ the side-band component $S_M$ exists in the lower band side of the base-band component $S_{DC}$. In this case, since the color filter 5 is so constructed that the phases of the color components R, G and B which form the side-band component $S_M$ have the phase difference of 120° with one another and are reverse between the adjacent horizontal scanning lines, the phase relation among the respective color components is as shown in FIGS. 3A and 3B, respectively. Thus, in order to separate the base-band and side-band components or luminance component and chrominance components, it is sufficient to utilize the vertical correlation therebetween.

With the example shown in FIGS. 1 and 2, if both the signals $S_o$ and $S_o'$ which are obtained during the adjacent horizontal scanning periods are added together, only the base-band or luminance component $S_{DC}$ (which will be hereinafter shown as $S_Y$) is obtained, while if both the signals $S_o$ and $S_o'$ are subtracted from one another, only the side-band or chrominance component $S_M$ (which will be hereinafter shown as $S_C$) is obtained.

The above operation, however, is established only in the case that the vertical correlation is intensive, and is incomplete or the separation is incomplete in the other cases. As a result, the chrominance component $S_C$ remains in the luminance component $S_Y$ in the latter cases.

The influence by the residual component on a reproduced picture will be described with reference to FIGS. 4 and 7. For convenience's sake, it is assumed that such an object which consists of only an objective part 7R of red (R) and an objective part 7B of blue (B) is considered as an object 7 with a boundary line 8 therebetween. In the case where a horizontal scanning line is taken as to include the boundary 8, when the horizontal scanning positions from (N−1) to (N+2) are scanned, signals $S_{o1}$ to $S_{o4}$ shown in FIGS. 5A to 5D are obtained.

Figure 6:
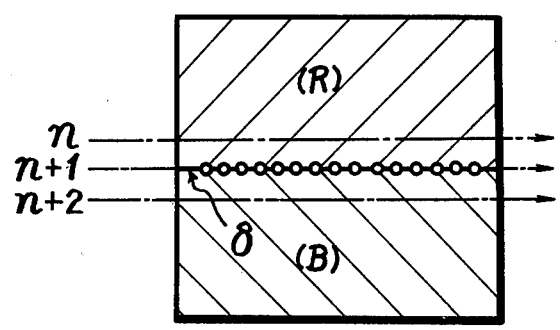
FIG. 6 is a diagram showing a reproduced picture of the object shown in FIG. 4.
Figure 5A:
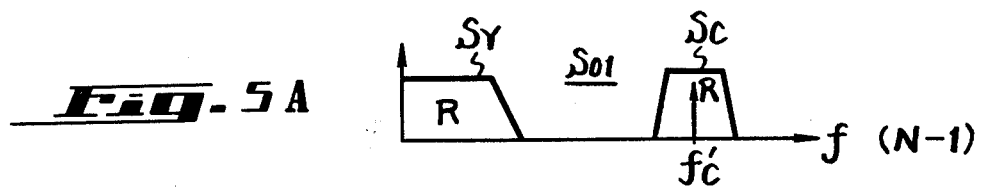
FIGS. 5A to 5D are frequency spectrum diagrams of a color picked-up signal obtained by picking up the object shown in FIG. 4, respctively.
Figure 5B:
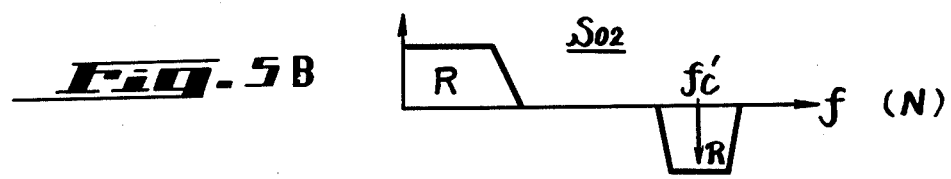
Figure 5C:
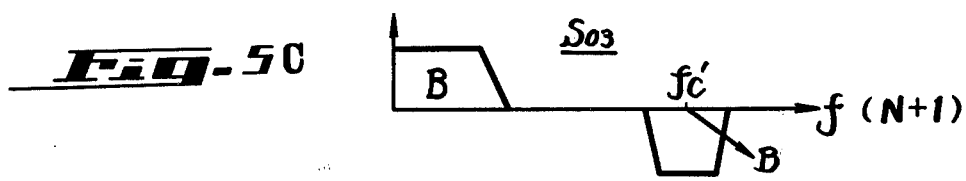
Figure 5D:
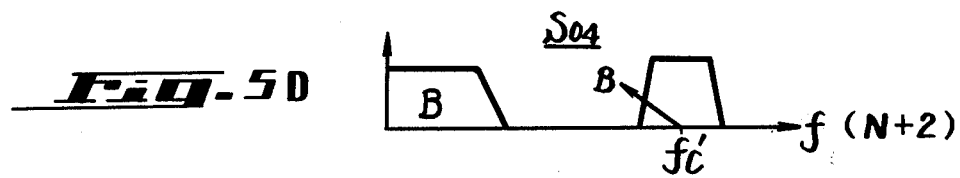
Figure 7A:
FIGS. 7A and 7B are diagrams used for comparing reproduced state of an object.
Figure 7B:

If the above signal processing is carried out so as to separate the luminance component $S_Y$ and chrominance component $S_C$ from the signals $S_{o1}$ to $S_{o4}$, respectively, complete signal separation is possible on the lines of (N−1) and N and on the lines of (N+1) and (N+2) because the vertical correlation is present between the lines (N−1) and N and between the lines (N+1 and (N+2), but the separation of the chrominance component $S_C$ is incomplete between the lines N and (N+1) with the boundary line 8 therebetween or the chrominance component $S_C$ remains in the band of the luminance component $S_Y$. For this reason, when a picture is reproduced by such a signal, the residual component appears on the reproduced picture as brilliant points along the boundary 8 as shown in FIG. 6 by small circles. Accordingly, when an object which extends in the horizontal direction of a band shape as shown in FIG. 7A is picked up, the boundaries in the horizontal direction of the object is reproduced as zig-zag or corrugated pattern as shown in FIG. 7B and hence the picture quality is deteriorated. Such a defeat is present remarkably when the frequency $f_c'$ is low.

In FIG. 6, n, n+1, ... represent the horizontal scanning lines after the vertical correlation for sake of convenience.

As described previously, the present invention is to provide a signal processing system which avoids having one signal component in the other signal component and which consists of a delay circuit delayed by a predetermined time interval and a signal control circuit carrying out a specific logic or gating operation.

An example of the present invention, which is applied to a television color camera apparatus, by way of example, will be described with reference to the drawings in which like numerals to those of FIGS. 1 to 7 designate like elements.

FIG. 8 is a systematic diagram of a television color camera apparatus to which an example of the signal processing system according to the present invention is applied. With this example, the image of an object 7 is projected through a lens system 9 and a color filter 5 as shown in FIG. 2 on a CCD 1, and a color pick-up signal $S_o$ from an output terminal 4 of the CCD 1 is supplied to a delay circuit 11 of 1H, an adding circuit 12 and a subtracting circuit 13 which are supplied with the output signal from the delay circuit 11, respectively so as to separate multi-imposed signals. Thus, the adding circuit 12 produces a luminance component $S_Y$, while the subtracting circuit 13 produces a chrominance component $S_C$, respectively.

The separated luminance component $S_Y$ from the adding circuit 12 contains residual components due to incomplete separation in accordance with the property of the object 7, but in this invention the luminance component $S_Y$ is separated to be a low band portion and at least a high band portion in which the chrominance component exists. That is, in the case where there exists the residual component, a luminance component from which its high band component is removed is used as the luminance component $S_Y$.

To this end, the luminance component $S_Y$ is applied firstly to a low pass filter 14 by which a desired low-band component $S_{DL}$ is separated from the luminance component $S_Y$. Then, this low-band component $S_{DL}$ is fed to an adding circuit 15 and to a subtracting circuit 16 from which a high-band component $S_{DH}$ of the luminance component $S_Y$ is obtained. The high-band component $S_{DH}$ is fed to a delay circuit 17 of 1H and thereafter through an input terminal 20B to a signal control circuit 20 for the residual component which is also supplied with the non-delayed high-band component $S_{DH}$ through an input terminal 20A from the circuit 16. Thus, the signal control circuit 20 produces at its output terminal $30_a$ an output signal $S_H$ which is related to whether the residual component is present or not. Although the operation of the signal control circuit 20 will be described later, the output signal $S_H$ therefrom is fed to the adding circuit 15 to be composed with the low-band component $S_{DL}$. The composite signal from the adding circuit 15 is used as a luminance component $S_Y'$ in the circuit at the following stage.

Accordingly, if the luminance component $S_Y'$ and demodulated components of the chrominance components are applied to a matrix circuit 21, the matrix circuit 21 produces at its output terminals $21_a$, $21_b$ and $21_c$ desired color video signals, for example, the luminance signal Y, and color difference signals (R-Y) and (B-Y) of the NTSC system, respectively.

In FIG. 8, numeral 22 designates a delay circuit connected between the adding circuit 12 and the subtracting circuit 16 so as to compensate for the time delay caused by the provision of the low pass filter 14, 23 designates a delay circuit connected to the transmission path of the chrominance signal $S_C$ from the subtracting circuit 13 so as to compensate for the similar time delay, and 24A and 24B designate demodulating circuits having different demodulating axes and connected between the delay circuit 23 and the matrix circuit 21 for demodulating color components of, for example, (B−G) and (R−(G+B/2)), respectively.

It is discriminated by observing the luminance component after the vertical correlation processing whether there remains the residual component or not. That is, when the picture quality is deteriorated by the residual component, brilliant points appear on a reproduced picture and deteriorate the picture quality only in the case where only the low-band component is obtained from the n-line and the components upto the high-band component are obtained from the (n+1)-line after the n− and (n+1)-lines are subjected to the correlation processing.

If the relation between signals applied to the respective input terminals 20A and 20B of the signal control circuit 20 for the residual component is classified, they can be classified to four sets as shown in FIGS. 9A to 9D, respectively. These figures show signals after the signals obtained during the adjacent horizontal scanning periods are subjected to the correlation processing, and hence the composite output signal $S_Y$ from the adding circuit 12, respectively. As the signal relation, such cases can be considered that the output signals $S_Y$ obtained from the n− and (n+1)-lines are both only of a low band (refer to FIG. 9A), include a high-band component (refer to FIG. 9B), and either one of both the signals $S_Y$ includes a high-band component (refer to FIGS. 9C and 9D).

In the above four cases, the deterioration of a picture is caused only in the case of FIGS. 9C and 9D, so that in the case where only one of the signal components is of a low-band, if a high-band component is removed or the output signal $S_Y'$ of the adding circuit 15 is processed to be only the low-band component $S_{DL}$, the brilliant points caused by the residual component are prevented from being produced and hence the deterioration of a picture quality (picture resolution) can be avoided.

To this end, the signal control circuit 20 is so constructed that it produces the output signal $S_H$ only when the high-band components fed to the pair of input terminals 20A and 20B are both present and such a control operation is achieved that the level of the output signal $S_H$ depends upon the level of an input signal whose level is lower than that of the other input signal.

Figure 10:
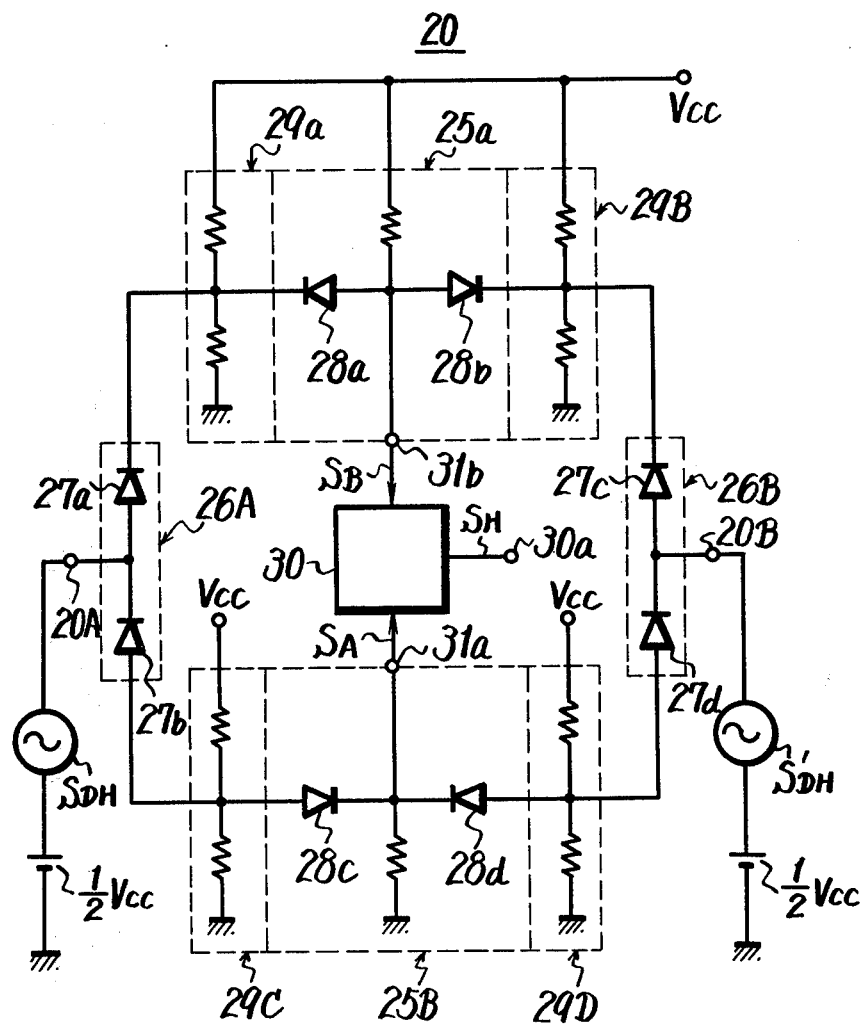

FIG. 10 is a fundamental circuit construction of the signal control circuit 20 which produces an output signal by logicprocessing or gating the same phase components of the signals $S_{DH}$ and $S_{DH}'$. To this end, two gating circuits 25A and 25B are provided which have polarity discriminating circuits 26A and 26B for signals, respectively. In the illustrated example, the polarity discriminating circuits 26A and 26B are formed of diodes $27_a$, $27_b$, and $27_c$, $27_d$, respectively, while the gating circuits 25A and 25B are formed of diodes $28_a$, $28_b$ and $28_c$, $28_d$ connected in opposite polarities, respectively. For example, the gating circuit 25A carries out the gate in the positive direction and the other gating circuit 25B carries out the gate in the negative direction. Gated output signals $S_A$ and $S_B$ therefrom are applied to a circuit 30 of AND construction to be composed as the output signal $S_H$ which is then fed through the terminal $30_a$ to the adding circuit 15 of the following stage. In FIG. 10, 29A to 29D are bias supply circuits which supply desired bias to the gating circuits 25A, 25B and discriminating circuits 26A, 26B, respectively.

FIG. 11 shows another example of the signal control circuit 20 which is simplified further as compared with that shown in FIG. 10. The example of FIG. 11 includes four diodes $D_1$ to $D_4$ which are connected as a bridge circuit D and a series circuit 34 consisting of a Zener diode $34_a$ and a resistor $34_b$ which series circuit is connected between a power supply terminal 33 of $V_{CC}$ and one diagonal connection point a of the diode bridge D and achieves the gating operation. Another series circuit 35 consisting of a Zener diode $35_a$ and a resistor $35_b$ is connected between the other diagonal connection point c of the diode bridge D and the ground. From connection points $P_U$ and $P_L$ between the resistor $34_b$ and Zener diode $34_a$ and between the resistor $35_b$ and Zener diode $35_a$ there are led output terminals $31_a$ and 31$_b$, respctively. In FIG. 11, 36$_a$ and 36$_b$ indicate resistors provided in the series circuits 34 and 35 for discharge, respectively. Other diagonal connection points b and d of the diode bridge D are supplied with the signals S$_{DH}$ and S$_{DH}'$, respectively, but which are superimposed with one-half of the power supply source voltage V$_{CC}$.

The operation of the signal control circuit 20 for the residual component thus formed as shown in FIG. 11 will be given by way of example. In this case, however, the circuit condition is determined as follows. That is, the Zener diodes 34$_a$ and 35$_a$ are same in characteristics, their Zener voltage is taken as V$_Z$, their current as I$_Z$, the resistance value of the resistors 34$_b$ and 35$_b$ as R$_o$, that of the resistors 36$_a$ and 36$_b$ as R$_D$, and the forward voltage drop of the diodes D$_1$ to D$_4$ as V$_f$, respectively.

Accordingly, the voltage V$_{b1}$ between the terminal 33 and the diagonal connection point b is expressed by the following expression (1).

$$V_{b1} = R_o(I_Z + \frac{V_Z}{R_D}) + V_Z + V_f \quad (1)$$

The voltage V$_{b2}$ between the connection point b and the ground is similarly expessed by the equation (1), so that the following relation (2) is established.

$$V_{CC} = V_{b1} + V_{b2}$$
$$= 2\left\{R_o(I_Z + \frac{V_Z}{R_D}) + V_Z + V_f\right\} \quad (2)$$

While, in the case where both the signal components S$_{DH}$ and S$_{DH}'$ are zero, the voltage of $\frac{1}{2}$V$_{CC}$ is impressed across the connection point b and the ground. Thus, the diode bridge is balanced and the output signals S$_A$ and S$_B$ therefrom are both zero. That is, when both the signal components S$_{DH}$ and S$_{DH}'$ are not supplied to the signal control circuit 20, no gated signal is derived therefrom.

The operation of the signal control circuit 20 including the above gating operation is summerized in the following table I.

Table I

| | Signal S$_{DH}$ | Signal S$_{DH}'$ | Output S$_A$ | Output S$_B$ |
|---|---|---|---|---|
| 1 | 0 | 0 | 0 | 0 |
| 2 | 0 | + | 0 | 0 |
|   | + | 0 | 0 | 0 |
| 3 | 0 | − | 0 | 0 |
|   | − | 0 | 0 | 0 |
| 4 | + | − | 0 | 0 |
|   | − | + | 0 | 0 |
| 5 | + | + | S$_{DH}$(\|S$_{DH}$\|<\|S$_{DH}'$\|) S$_{DH}'$(\|S$_{DH}'$\|<\|S$_{DH}$\|) | 0 |
| 6 | − | − | 0 | S$_{DH}$(\|S$_{DH}$\|<\|S$_{DH}'$\|) S$_{DH}'$(\|S$_{DH}'$\|<\|S$_{DH}$\|) |

Next, some of typical gating operations will be explained.

When only the positive signal component S$_{DH}'$ is input through the terminal 20B, the diode D$_4$ is made ON and through which a current corresponding to the signal component S$_{DH}'$ passes. In this connection, the current I$_Z$ flowing through the Zener diode 35$_a$ increases but the Zener diode 35$_a$ is held in backward bias. As a result, its Zener voltage V$_Z$ is still kept constant. That is, even if the current I$_Z$ flows, no output signal is obtained at the terminal 31$_a$ which is same as the condition that not input signal is applied thereto. Since when only the terminal 20A is supplied with the position signal component S$_{DH}$, the same result is obtained, so that its explanation will be omitted.

When the negative signal component S$_{DH}'$ is supplied to the terminal 20B, the diode D$_3$ is made ON. Thus, the current I$_Z$ flows through the Zener diode 34$_a$, but the point P$_U$ is attracted to the negative side. For this reason, the backward bias of the Zener diode 34$_a$ becomes deep and the output signal is not varied or the output signal S$_A$ is zero.

As described above, even if one of the signal components S$_{DH}$ and S$_{DH}'$ is input, no variation is caused in the output signal of the signal control circuit 20. When the signal components S$_{DH}$ and S$_{DH}'$ different in phase are input, the similar result is obtained. By way of example, when the negative signal component S$_{DH}$ is fed to the terminal 20A and the positive signal component S$_{DH}'$ is fed to the other terminal 20B, the diode D$_1$ is made ON by the negative signal component S$_{DH}$ and the diode D$_4$ is made ON by the positive signal component S$_{DH}'$, respectively. However, since the conduction of the diodes D$_1$ and D$_4$ is in the direction that the Zener diodes 34$_a$ and 35$_a$ are backwardly biased, the output signals S$_A$ and S$_B$ are both zero due to the reason same as that described above.

When the signal components S$_{DH}$ and S$_{DH}'$ are input in the same phase, the following output signal is obtained from the signal control circuit 20. That is, in the case where the positive signal components S$_{DH}$ and S$_{DH}'$ are both input, if the condition S$_{DH}$ < S$_{DH}'$ is established, the diode D$_4$ is made ON and the diode D$_1$ is made ON also since the voltage at the point b is lower than that the point d. Thus, the output signal S$_B$ is not varied by the conduction of the diode D$_4$ as described above, but the diode D$_1$ is made ON with the result that the voltage at the point a becomes higher and hence the Zener diode 34$_a$ is biased in the forward direction. Thus, the Zener diode 34$_a$ loses its Zener effect. As a result, the voltage at the point P$_U$ is varied in response to a variation of the level of the signal component S$_{DH}$ and hence the output signal S$_A$ in response to the signal component S$_{DH}$ can be obtained.

While, in the case of the condition S$_{DH}'$ < S$_{DH}$, the output signal S$_A$ in response to the signal component S$_{DH}'$ is obtained.

In the case where the signal components S$_{DH}$ and S$_{DH}'$ are both negative, the diodes D$_2$ and D$_4$ are made ON together. Due to the conduction of the diode D$_2$, it will be easily understood that the output signals S$_A$ and S$_B$ in response to the signals S$_{DH}$ and S$_{DH}'$ are obtained.

FIG. 12 is a waveform diagram which is used for explaining the above operation and in which the signal components S$_{DH}$ and S$_{DH}'$ are shown as sine waves, respectively, by way of example. The output signal from the signal control circuit 20 is shown in FIG. 12 as the parts with hatches.

As described above, the signal control circuit 20 for the residual signal component of the present invention carries out the gating operation to produce the output signals only when the signal components S$_{DH}$ and S$_{DH}'$ same in phase are input or the input signals are of the relationship as shown in FIG. 9B. As a result, when the residual component exists at the high-band area of the luminance signal S$_Y$, an output signal from which the residual component is eliminated effectively is obtained from the signal control circuit 20.

Figure 4:
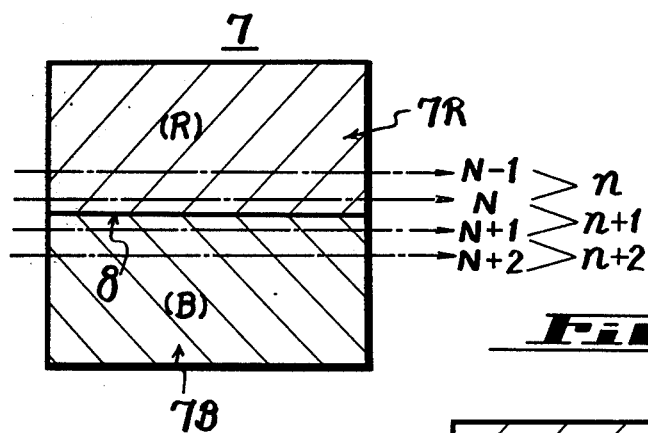
FIG. 4 is a schematic diagram showing a model of an object to be picked up.
Figure 13:
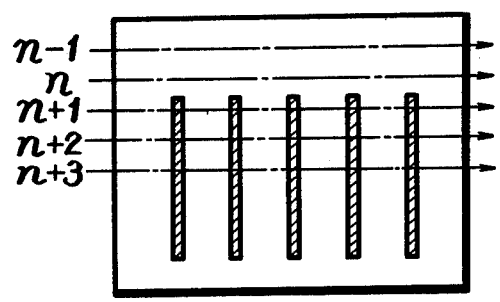
FIGS. 13 and 14 are schematic diagrams showing other examples of patterns of objects to be picked up.
Figure 14:
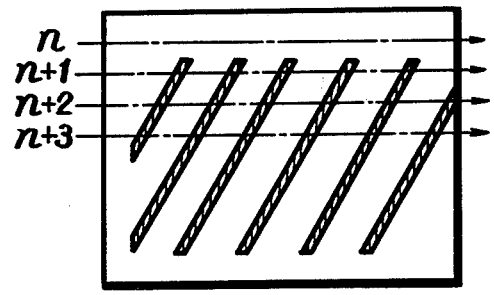

The above description is given on the case where the object 7 shown in FIG. 4 is picked up, but the circuit of the present invention can effectively remove a residual component and hence prevents the picture quality from being deteriorated when an object with a complicated pattern such as shown in FIGS. 13 and 14 is picked up.

Such a case will be described firstly that an object with a longitudinal pattern shown in FIG. 13 is picked up. When the signals corresponding to n- and (n+1)-lines are applied to the signal control circuit 20, the signal $S_H$ therefrom becomes zero ($S_H=0$) as described previously, so that the luminance component $S_{Y'}$ includes only a low-band component. When the signals corresponding to (n+1)- and (n+2)-lines are supplied to the signal control circuit 20, both the signals include a high-band component, so that the output signal $S_H$ is obtained. Accordingly, the luminance component $S_{Y'}$ contains a high-band component also. When the signals corresponding to (n+3)-line and the following ones are supplied, the similar operation is carried out.

Thus, only the first contour of an object having the vertical correlation (stripe pattern) or its end existing between n- and (n+1)-lines is not reproduced, but the portion following thereto is reproduced completely. Therefore, even if the signal processing or controlling according to the present invention is achieved, there occurs no problem.

Next, in the case of an object with the oblique pattern shown in FIG. 14, its vertical correlation is feeble. However, even if the above object is picked up, only the contour between n- and n+1)-lines is not reproduced from the same reason set forth above but the other portion of the object is reproduced completely. Hence no influence appears on a reproduced picture. Thus, even if an object with any pattern is picked up, zig-zag patterns can be removed on the contours in the horizontal direction.

As described above, according to the present invention, a signal which is delayed by a predetermined signal and a signal which is not delayed are compared, and the output signal which is related to the signals is produced only when the non-delayed and delayed signals are both present, so that the signal control circuit of the invention is much preferred as a signal processing circuit for a color television camera apparatus as set forth previously.

That is, if the circuit of the present invention is employed in a color television camera, even in the case where an object with a boundary portion extending in the horizontal direction (pattern) is picked up, residual components can be removed positively. As a result, no deterioration of picture quality is caused and hence a picture good in quality can be always reproduced.

The above description is given on the case where the circuit of the invention is employed in a color television camera which uses a solid state image sensor, but it may be apparent without any example that the present invention is used in a signal processing circuit system which will separate two superimposed information signals by the phase-separation manner.

The color filter 5 shown in FIG. 2 is merely an example and it is free to select lights passing through the filter.

Further, since CCDs more than one can be used to form a television camera, the circuit of the present invention can be of course used in such a television camera.

It may be apparent that many modifications and variations could be effected by one skilled in the art without departing from the spirits or scope of the novel concepts of the present invention so that the scope of the invention should be determined by the appended claims.

We claim as our invention:

1. A signal gating system for use in a periodic signal processing circuit comprising:
   a system input to be supplied with an incoming periodic signal,
   delay means for delaying said periodic signal by one period thereof,
   gate means having a pair of input terminals,
   the periodic signal and the delayed periodic signal being supplied to said input terminals respectively,
   said gate means including means to produce first and second gated output signals,
   said first gated output signal being zero for all combinations of polarities and magnitudes of said incoming periodic signal and delayed periodic signal except for the case where said incoming periodic and delayed periodic signals both have a positive polarity,
   said second output signal being zero for all combinations of polarities and magnitudes of said incoming periodic signal and delayed periodic signal except for the case where said incoming periodic and delayed periodic signals both have a negative polarity,
   a further gate,
   said first and second output signals being coupled to inputs of said further gate,
   and said further gate having a system output terminal for deriving an output signal selectively in response to the operation of said gated means.

2. A signal gating system in accordance with claim 1 wherein said gate means includes first and second polarity discriminating circuits for receiving the incoming periodic signal and delayed periodic signal respectively, first and second gating circuits, each of which is coupled to both of said first and second polarity discriminating circuits, each of said first and second gating circuits having output terminals for producing said first and second output signals.

3. A signal gating system in accordance with claim 1 wherein said gate means includes a bridge circuit and wherein the periodic and the delayed periodic signals are coupled to opposing inputs of the bridge circuit, the bridge circuit having a pair of output terminals for producing said first and second output signals.

4. A signal gating system in accordance with claim 1 wherein the periodic and delayed periodic signals supplied to inputs of said gate means contain information which may be displayed as adjacent lines of information on a cathode ray tube.

5. A signal gating system in accordance with claim 4 wherein said periodic and delayed periodic signals comprise video signals.

6. A signal gating system in accordance with claim 5 wherein the video signals are derived from a color camera using a solid state image sensor, a corresponding storage member, and a readout register for reading out the stored light information serially.

* * * * *